(12) United States Patent
Abel et al.

(10) Patent No.: US 6,768,716 B1
(45) Date of Patent: Jul. 27, 2004

(54) LOAD BALANCING SYSTEM, APPARATUS AND METHOD

(75) Inventors: François G. Abel, Rueschlikon (CH);
Peter Buchmann, Langnau (CH);
Antonius Engbersen, Feusisberg (CH);
Andreas Herkersdorf, Langnau (CH);
Ronald P. Luijten, Horgen (CH);
David J. Webb, Rueschlikon (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/551,049

(22) Filed: Apr. 18, 2000

(30) Foreign Application Priority Data

Apr. 10, 2000 (EP) .......................................... 00107655

(51) Int. Cl.[7] .................................................. H04J 3/04
(52) U.S. Cl. ........................ 370/230; 370/536; 370/542
(58) Field of Search .......................... 709/105; 370/230, 370/235, 389, 392, 532–536, 542–544, 468

(56) References Cited

U.S. PATENT DOCUMENTS 5,691,986 A * 11/1997 Pearlstein .................... 370/536
5,903,573 A * 5/1999 Wolf ........................... 370/535
6,157,674 A * 12/2000 Oda et al. .................... 370/538
6,172,988 B1 * 1/2001 Tiernan et al. ............... 370/465
6,215,788 B1 * 4/2001 Sakurai et al. ............... 370/398
6,477,185 B1 * 11/2002 Komi et al. .................. 370/536
6,535,530 B1 * 3/2003 Matsui ......................... 370/536

* cited by examiner

Primary Examiner—Chau Nguyen
Assistant Examiner—Andy Lee
(74) Attorney, Agent, or Firm—Thomas Beck; Louis Herzberg

(57) ABSTRACT

A real-time load-balancing system for distributing a sequence of incoming data packets emanating from a high speed communication line to a plurality of processing means, each operating at a capacity that is lower than the capacity of the high speed communication line; the system according to the invention comprises: a parser capable of extracting a configurable set of classifier bits from the incoming packets for feeding into a compression means; the compression means is capable of reducing a bit pattern of length K to a bit pattern having a length L which is a fraction of K; a pipeline block for delaying incoming packets until a load balancing decision is found, and an inverse demultiplexer for receiving a port identifier output from said compression means as selector and for directing pipelined packets to the appropriate output port.

17 Claims, 4 Drawing Sheets

LOAD BALANCING SYSTEM, APPARATUS AND METHOD

BACKGROUND OF THE INVENTION

The present invention relates to systems and methods for load-balancing when distributing a sequence of incoming data packets emanating from a high speed communication line to a plurality of processing means (including electronic processors as well as electronic data processing units comprising a plurality of processors) e.g. for sending data packets from one processor means for transmission to another processor means, such as in a network that interconnects a multiplicity of processors.

PRIOR ART

Load balancing and hashing are two classic topics in Computer Science. Prior art channel stripping (also known as load sharing or inverse multiplexing) is frequently used in networking because of transmission, processing bottlenecks or simply because of price performance ratio. In that scheme, a Round Robin Algorithm or a Load Sharing Algorithm is used that strips the packets belonging to a stream, across multiple channels.

A major problem with stripping is that packets may be received out of order due to different delays on different channels and due to different packet sizes. Three types of solutions for reordering are known:

i) keeping each flow on only one physical link and accepting that a single flow cannot use more than this bandwidth link, ii) reordering the received packets and accept waste of processing bandwidth, and iii) splitting packets up into fixed transfer units.

Dynamic load balancing, on the other hand, is a the classic topics in the field of parallel processing field, dealing with three general computing entities: computations, tasks and data. Prior art approaches are related to specific algorithms for parallel/distributed processors systems. In these cases, load balancing tries to find the mapping of computations, tasks or data, to computers that results in each computer having an approximately equal amount of work in order to reduce run time and increase the Overall efficiency of a computation.

On the other hand, constant and massive increases in bandwidth demand have pushed very high speed networks into multigigabit-data-rate domain of operation. Performing real-time Layer 2 network processing according to prior art at that speed does already present a challenge for prior art technology: an ATM cell, for example, lasts 420 ns at 1 Gbit/s. The term "Layer" as used herein refers to the ISO reference model.

However, the transformation of the Internet into an important and ubiquitous commercial infrastructure has not only created rising bandwidth demands but also tends to significantly change consumer expectations in terms of performance, security and services.

These requirements translate into a large amount of additional network processing, as Layer 3 and Layer 4 information must be processed as well. This double trend of an increasing demand for bandwidth and an increasing demand for differentiated services (as defined by IETF standards) has put severe strains on traditional network processor architectures of currently available routers, and architecture designers are moving more and more towards pipelined and parallelized solutions in order to satisfy the processing demands imposed by very high speed networks.

Along with differentiated services support, a concept of traffic "flows" has emerged within the EP community over the past few years as well. A flow is usually defined as a sequence of packets sent from a particular source to a particular (unicast or multicast) destination for which the source desires special handling by the intervening routers, cf. Deering, S.,Hinden R., "Internet Protocol Version 6 (IPv6) Specification" RFC 18. Further, providing special handling, such as non-default quality of service or real-time service with a concept of flows, is accompanied by a set of new difficulties and constraints.

OBJECTS AND AIMS OF THE INVENTION

Accordingly, it is a primary object of the present invention to provide for a system and method capable of scaling the capacity or speed rate of a network processor by distributing the traffic flows of an aggregate high speed link onto a multiplicity of independent network processing entities.

Further objects and advantages of the invention will become apparent as this specification proceeds.

SUMMARY AND BRIEF DEFINITION OF THE INVENTION

The above objects and further advantages will be achieved according to a first embodiment of the invention by a load balancing system, also termed "load balancer" herein for brevity, as defined in claim 1.

According to a first general embodiment, the invention provides a real-time load-balancing system for distributing a sequence of incoming data packets emanating from a high speed communication line to a plurality of processing means, each operating at a capacity that is lower than the capacity of the high speed communication line, said system comprising: a parser means capable of extracting a configurable set of classifier bits from the incoming packets for feeding into a compression means;

said compression means being capable of reducing a bit pattern of length K to a bit pattern having a length L which is a fraction of K; a pipeline block for delaying incoming packets until a load balancing decision is found, and an inverse demultiplexer for receiving a port identifier output from said compression means as selector and for directing pipelined packets to the appropriate output port.

The term "processing means" as used herein includes processors as well as switching means or switching systems.

According to a second general embodiment, the invention provides for a method for distributing a sequence of incoming data packets emanating from a high speed communication line to a plurality of processing means (A,B; A,B,C; A,B,C,D; A,B, . . .) operating at a capacity that is lower than the capacity of the high speed communication line, said method comprising providing: a parser means for extracting a configurable set of classifier bits from the incoming packets for feeding into a compression means; said compression means reducing a bit pattern of length K to a bit pattern having a length L which is a fraction of K;

a pipeline block for delaying incoming packets until a load balancing decision is found, and an inverse demultiplexer for receiving a port identifier output from said compression means as selector and for directing pipelined packets to the appropriate output port.

According to a preferred embodiment, the system according to the invention additionally comprises a lookup memory for outputting a port identifier based on an index computed by said compression means, wherein each entry into said lookup memory is capable of dynamic coordination to any output port of said system so as to populate a large number of consumer unit requests per lookup memory entry and to collect lookup memory locations that are no longer in use for providing flexibility to perform a load balancing by providing a timeout per memory entry.

According to a further preferred embodiment, the system according to the invention additionally comprises an extended classifier means.

Further, it is preferred for many embodiments of the invention if the system additionally comprises a feed-back loop for controlling load distribution and for allocating data packets to the data processing means. Generally, a preferred embodiment of the compression means is a nonlinear hashing function.

The invention makes it possible that the more complex tasks, e.g., route lookup, buffer management, scheduling and policing, are performed by network processors, each running at a fraction of the aggregate link rate while—from an external perspective—the overall system acts as a single network processor operating at the full link rate.

The invention is based on a real-time, deterministic load balancing architecture that enables the dynamic distribution of traffic on a high speed (multigigabit/s) link over multiple lower rate processing entities in a flow-preserving manner. Now, according to the art, splitting and sharing of a flow over a multiplicity of processing elements is considered to constitute a complex task which tends to be avoided if the number of flows is high. A flow or connection is characterized by a concept of state that links successive packets or cells together.

A recent study of an optical carrier or OC-3 trunk within the Internet MCI's backbone indicates an average presence of up to 120.000 flows per second during peak hours.

BRIEF DISCUSSION OF THE DRAWINGS

The invention will now be discussed in more detail and with reference to the attached drawings in which.

Figure 8:
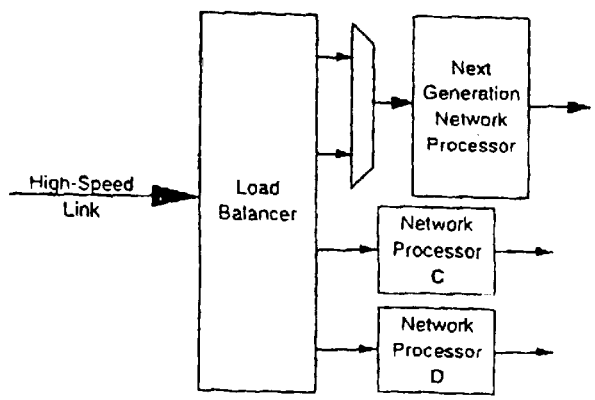
Figure 9:
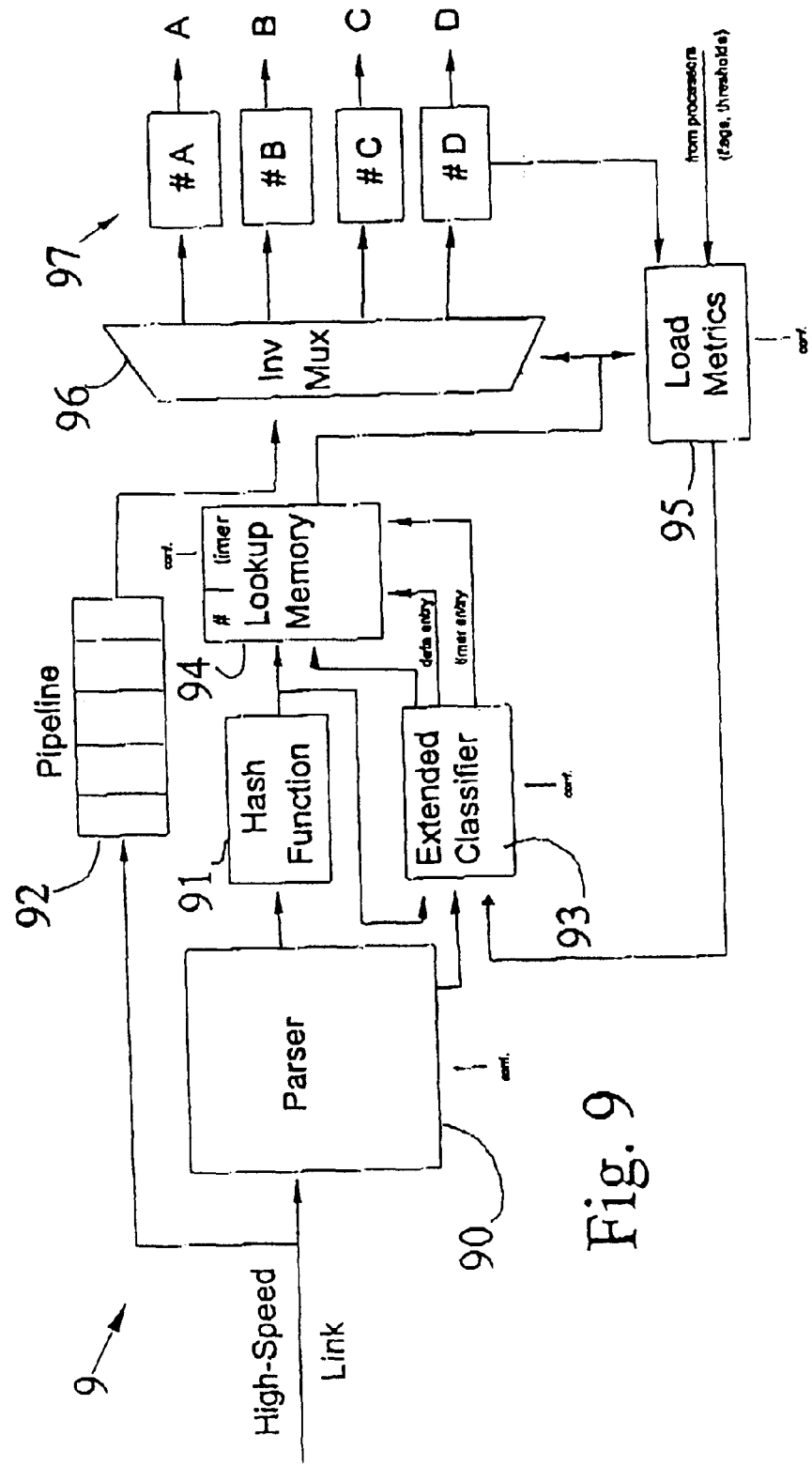

FIG. 8 presents a diagrammatic view of a trunk grouping example, again incorporating load balancing according to the invention; and FIG. 9 is a diagrammatic view of yet another preferred embodiment of the invention.

DETAILED EXPLANATION OF THE DRAWINGS

Figure 1:
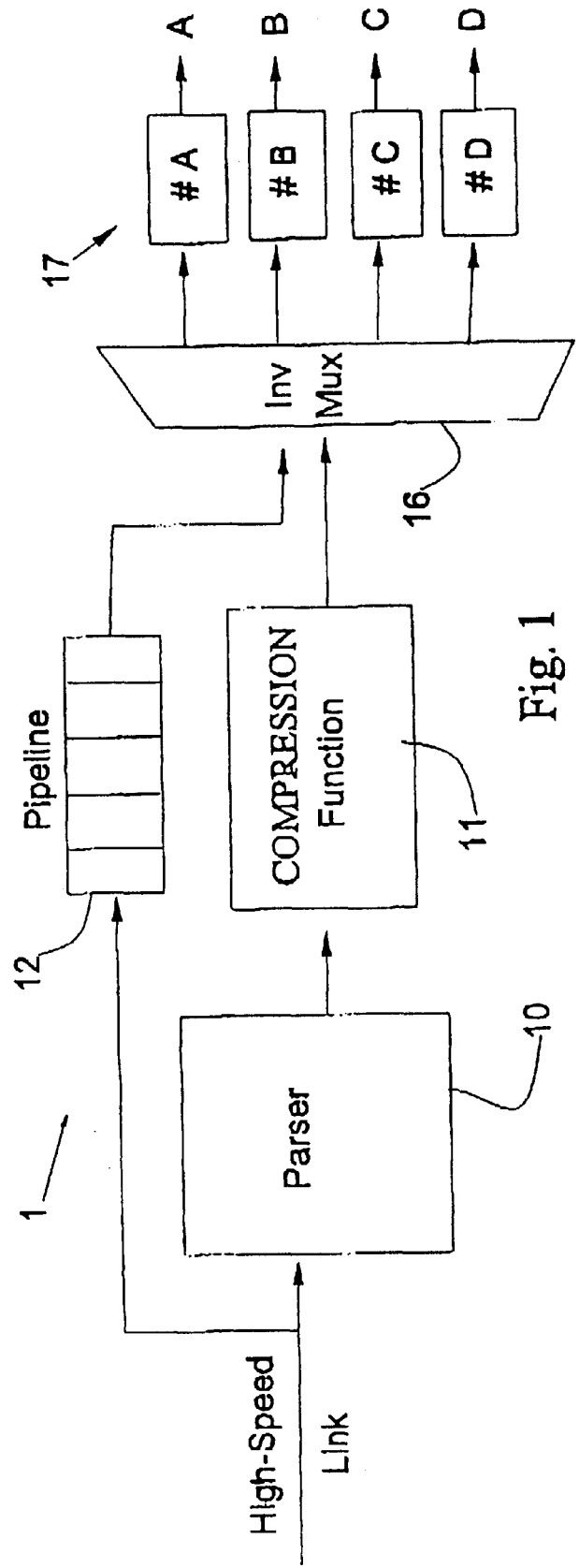
FIG. 1 is a schematic representation of a real-time load balancer according to the invention.
Figure 2:
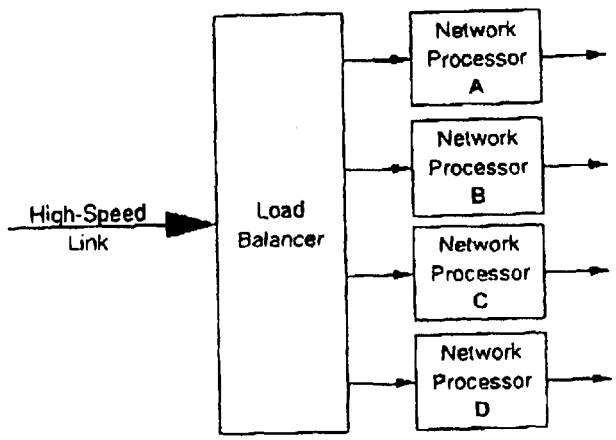
FIG. 2 is a diagram of a scalable network processor architecture incorporating a load balancer according to the invention.
Figure 3:
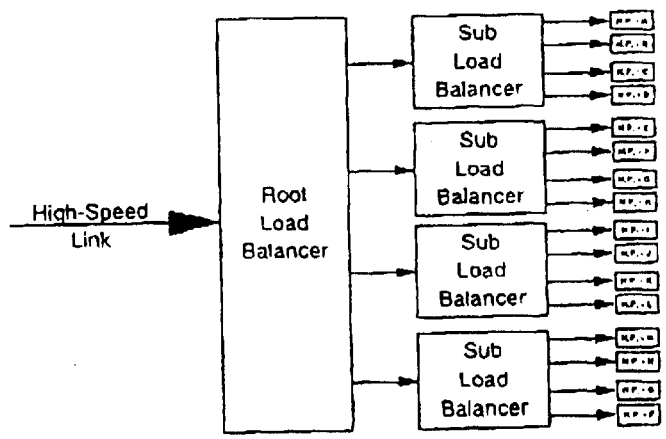
FIG. 3 is an example of a hierarchical architecture using the load balancer according to the invention.
Figure 4:
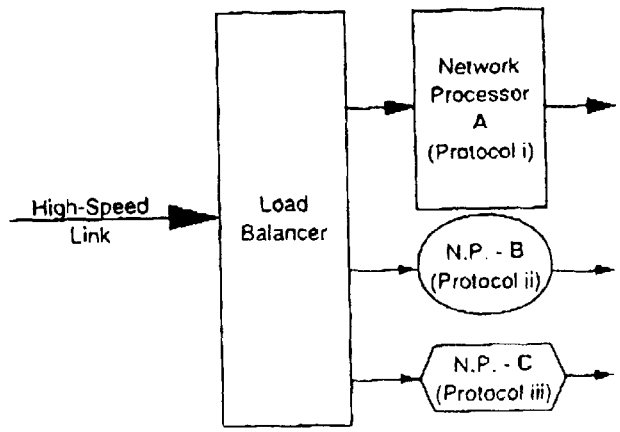
FIG. 4 shows a diagram of an example of a heterogeneous architecture, again including a load balancer according to the invention.

FIG. 1 shows a diagrammatic view of the elements of general embodiment of a real-time hash-based load balancer 1 according to the present invention, assuming an array of four network processors for purposes of explanation.

A parser 10 (sometimes also termed a "stripper") extracts a configurable set of classifier bits from the incoming packet header and payload and feeds some of them into a hash function block 11 while some others are fed into a extended classifier block 13. The parser 10 should be capable of providing flexibility in terms of number and types of extracted classifiers and of ensuring a broad applicability for various protocols. A preferred embodiment of the parser is a re-configurable finite state machine.

The compression function 11, e.g. a has function, maps a multiplicity of traffic flows or "connections" (a TCP/IP connection is characterized by two 48 bit socket classifiers) onto a defined number of flows or connection buckets (e.g. a 10 bit vector representing 1024 buckets). Each bucket aggregates the flow collisions occurring during the hash operation, and can be dynamically associated to any particular network processor. The number of buckets can be said to represent a measure for the "granularity" with which the link load is shared between the parallel processors.

Hashing ascertains that identical classifier inputs are mapped onto identical buckets in order to be processed by the same processor. This is a requirement for a flow preserving load balancing. In addition, it avoids interprocessors communications by keeping the flow state information local to each network processor.

An extended classifier block may be uses as explained in more detail below with reference to FIG. 9; the extended classifier block enhances the load balancing heuristics and explicitly impacts the load distribution of flows over the processors. Three input parameters are taken into account the result of the hash function, some configurable parameters extracted by the parser described above, a network processor identifier issued from a load metrics monitor.

Further, a pipeline 12 is provided for input to an inverse demultiplexer 16; optional further elements are a lookup memory (not shown in FIG. 1) and a load metrics unit (not shown in FIG. 1) as explained in more detail below.

FIGS. 2–5 illustrate a number of uses of a load balancing system according to the invention including connection of a high speed link via the load balancer to a number of network processors (FIG. 2), the connection of a high speed link via a main or root load balancer according to the invention with a plurality of subsidiary load balancers (or "sub load balancers") according to the invention with a multiplicity of network processors NP (FIG. 3), the connection of a high speed link via a load balancer according to the invention with a number of network processors operating with different protocols (FIG. 4) and the connection of a plurality of consumer units ("consumer") via a load balancer according to the invention as a scheduler (or scheduling system) with a plurality of processing entities ("resource") as explained below.

Figure 5:
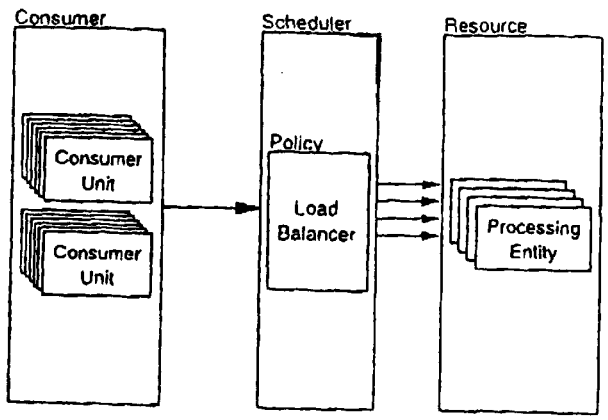
FIG. 5 represents a diagrammatic view of a load balancer according to the invention in a resource management system.

In this context, the invention can be used in a resource management system or method based upon a real-time scheduling system for scaling the capacity or speed of a given resource. A "resource" in the context of the invention is a set of independent processing entities running in parallel, while the term "scheduling system" is intended to refer to a mechanism or policy for efficiently allocating this resource to a consumer. A "consumer" is composed of a set of independent or loosely coupled units, each of them requesting to be processed within a specific sequence and by a unique processing entity as illustrated in FIG. 5.

Figure 6:
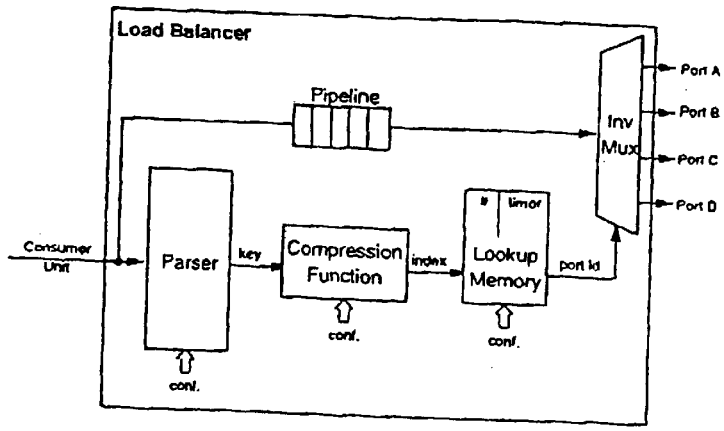
FIG. 6 shows a diagrammatic view of a real-time scheduling architecture employing an alternative load balancer according to the invention.

FIG. 6 shows the building blocks of an embodiment of the real-time scheduling system according to the invention implementing a load balancing policy. Consumer units are fed into the scheduling system, and are distributed in real-time over a set of N output ports (four in that case).

The concepts of the invention will be discussed first in the context of network processors or communication forwarding engines where it is particularly suitable. In this domain of application, network traffic can be regarded as an aggregation of flows or connections. A flow or connection includes sequences of packets (in IP) or cells (in ATM) which can be considered individually.

This characteristic can be termed a "stateful" approach when forwarding packets (or cells) belonging to one and the same flow. The aim of such statefullness is to identify the flow to which each packet belongs so that each packet can be directed to the same endhost with the same processing policy, and with the same quality of service.

This requires that the network processors or communication forwarding engines keep track of the active flows that are passing through them. Thus, statefullness plays a key role in the present invention: the ability to keep the state information of a certain flow locally and statically associated with a processing entity, is assumed to constituted the basic requirement for achieving linear scalability among independent processing units according to the invention.

It ist to be noted that this embodiment of the inventive method also is applicable in domains where a similar relationship and analogy exists between traffic, flow, and state information.

However, for reasons of brevity and ease of understanding, the preferred method according to the invention will be discussed in connection with a specific networking field as represented in FIG. 9 showing a scalable network processor (or SNP) architecture including a load balancer according to the invention; the architecture is built from four slower network processors [e.g. A, B, C, D . . . ].

The system 9 shown in the diagram of FIG. 9 includes a parser 90 (or "stripper") and extracts a configurable set of classifier bits from the incoming packet header and payload and feeds some of them into a hash function block 91 while some others are fed into a extended classifier block 93. The parser 90 should be capapble of providing flexibility in terms of number and types of extracted classifiers and of ensuring a broad applicability for various protocols. Again, a preferred embodiment of the parser is a reconfigurable finite state machine.

The hash function 91 maps a multiplicity of traffic flows or "connections" (a TCP/IP connection is characterized by two 48 bit socket classifiers) onto a defined number of flows or connection buckets (e.g. a 10 bit vector representing 1024 buckets). Each bucket aggregates the flow collisions occurring during the hash operation, and can be dynamically associated to any particular network processor. The number of buckets can be said to represent a measure for the "granularity" with which the link load is shared between the parallel processors.

Hashing ascertains that identical classifier inputs are mapped onto identical buckets in order to be processed by the same processor. This is a requirement for a flow preserving load balancing. In addition, it avoids interprocessors communications by keeping the flow state information local to each network processor.

The extended classifier block 93 enhances the load balancing heuristics and explicitly impacts the load distribution of flows over the processors. Again, three input parameters are taken into account, i.e. (a) the result of the hash function; (b) some configurable parameters extracted by the parser described above; and (c) a network processor identifier issued from a load metrics monitor.

Further, a pipeline 92 is provided for input to an inverter multiplexer 96 as well as a lookup memory 94 and a load metrics unit 95 explained in more detail below.

For example, four OC12c processors can support an OC48c stream, or 16 OC12c (or four OC48c) can support an OC192 and even an OC192c stream. The number of network processors running in parallel is selectable within reasonable bounds.

A load balancer according to the invention is preceding the array of network processors (NP). The load balancer serves to distribute incoming packets in a dynamic and flow-preserving manner onto the individual network processors. The term "dynamic" in this context is intended to mean that the association between a traffic flow and a network processor is made in real-time once a new flow or flow bundle enters the load balancer.

The term "flow-preserving" is intended to mean that all packets of a particular traffic flow or virtual connection are always delivered to the same network processor. This latter property is believed to be essential for ascertaining a local validity of connection state information within the individual network processors and for avoiding interprocessor communications which are not applicable at typical speed rates of particular interest for the invention, i.e. at least about 10 Gb/s or more.

Three types of outputs are generated in this manner:
an extended vector (for example n=3) that is applied together with the hash result to the lookup memory,
a data entry identifying one of the N processors
a data timer characterizing an active flow duration.

The net effect of the extended vector is that any flow within one hashed bucket may be assigned to different processors, dependent upon quality of service parameters, security information or precedence information of each individual flow.

It is to be noted that only static flow classifiers—i.e. those that do not change during the lifetime of a flow—may be considered in the generation of this extended vector. This is designed to ensure the flow-preserving character of the load balancer. In contrast, dynamic classifiers, e.g. the transmission control protocol (TCP) window size, could result in distributing or "striping" flow over different processors.

The data entry in a system or method according to the invention is always calculated a priori but is used only when a free location is found (i.e. the memory cell contains 1) during memory lookup. A free location indicates that the lookup memory cell currently addressed by the result of the hash function—and by the extended vector—has not yet been allocated to a particular processor.

As a consequence, the data entry according to the invention (exemplified in FIG. 1 as A, B, C or D) can be written into this empty memory cell and will stay there until the flow ends. In order to ascertain flow-preservation of previously allocated flows, the data entry is not used when the memory lookup is not free (i.e. is not empty).

The data entry according to the invention may be based on static flow classifiers (as is the case for the extended vector) but it also-takes into account any dynamic classifiers—and specifically the network processor identifier—via a feedback path from the Load Metrics block, or any information, such as the TCP window size (which can serve as an indication for the size of the connection).

The timer entry according to the invention is a timer value that is used to characterize the time span or duration of an active flow. Any flow for which the load balancer has not recognized a packet within the last timer period is considered an "expired flow". The timer value is a function of the service type carried by the flow.

Generally, a "best effort traffic type" will have associated a bigger timer value than would be associated with a constant bit rate flow or a real-time traffic type flow. A preferred embodiment of the extended classifier is a combinatorial logic tree with few levels.

The lookup memory outputs a network processor identifier (e.g. A, B, C or D in FIG. 1) based upon the hash and upon the extended vector as input address. When a free entry (processor identifier is 1) is selected, the new entry proposal from the extended classifier block is stored in that location and simultaneously provided as output result. The aim is to populate a large number of flows per lookup memory entry (also termed a "bucket" herein).

A bucket may be divided into n subbuckets, each of them corresponding to a particular range of the proposed timer entry. The timer entry is always written in the lookup memory unless the timer entry is smaller than the one already stored at that location.

In order to collect lookup memory locations that are no longer in use and therefore provide the requested flexibility to perform the desired load balancing, a timeout per memory entry can be used. To this end, a free running timer is reset whenever the memory location is addressed. When or if the free running timer reaches the timer entry stored at that memory location, the processor entry number is cleared (set to 1) and the entry is freed.

The load metrics block manages the load distribution of each network processor and submits the new network processor identifiers (e.g. A, B, C or D in FIG. 2) to the extended classifier. The load metrics unit may operate in a standalone or in a feedback mode. The feedback mode is used when a network processor is able to provide a status about its current load through flags, thresholds, counters, or flow control indications.

For most embodiments of the invention, an indication about buffer allocation is normally sufficient to represent the level of resource consumption.

The standalone mode is used when a network processor is not able to provide feedback indication. A performance characteristic indicator of the network processor must then be setup into the load metrics unit. For example, such an indicator could be the number of packets that can be processed per second, or a maximum bandwidth indication. By monitoring the output of the lookup memory—indicating the number of packets allocated to each network processor—and the thresholds of the four output buffers (e.g. #A, #B, #C, #D in FIG. 1), the load metrics unit can perform the associated load balancing algorithm without any feedback from the attached processors. By default or/and in the case of overload of any network processor, the load metrics unit performs a fair-load-sharing algorithm.

The pipeline block serves to delay incoming packets until the load balancing decision is performed and is issued by the lookup memory. The length of the pipeline is finite, and its preferred embodiment is that of a sequence of cascadable registers.

The "InvMux" (inverse demultiplexer) block implements an inverse demultiplexing function. It uses the network identifier output from the lookup memory as selector and directs the pipelined packets to the appropriate network processor buffers (e.g. #A, #B, #C, #D in FIG. 1). Buffers #A, #B, #C and #D are elastic output buffers with the primary function to absorb traffic bursts and to adapt the aggregated link rate to the slower network processor interfaces. The host interface block provides access to all the internal registers of the load balancer.

As will be apparent, the method according to the invention is a general method for building a network processor from a set of network processors operating in parallel and at fraction of the incoming link rate. With such a method, the incoming sequence of packets belonging to each flow is preserved, and the parallelization of the slower network processors can be achieved without any interprocessor overhead, which is a key point when operating with independent processors.

The method according to the invention indicates a way of how to put a set of computing entities in parallel thus solving both an essential performance issue as well as an economic issue.

Thus, the invention provides for a parallel architecture solution when the required performance is not available from the conventional scalar architecture. Further, even when scalar solutions with the required performance are available, parallel solutions are capable of providing an improved price performance ratio and improved scalability because speed and cost are strongly tied together in very large scale integration (VLSI).

Further, the invention provides a response to the continued growth of data rates in high speed networks. As this growth is mostly sustained by a common and universal use of traffic aggregation performed at all levels of the "Telephony Scale Data Networking Pyramid", the inventive method based on load balancing represents an alternative or complement to various bandwidth grooming and access concentrator techniques according to the art.

Essential advantages provided by the invention in terms of keywords can be summarized as follows:

"real-time: doing load balancing at the incoming line speed and without any buffering; this is believed to be critical at multi-gigabit rates. Thanks to the system according to the invention approach can be used and implemented into silicon operating at very high speeds e.g. hundreds of MHz with a current 0.12 micrometer CM0S7S technology.

Deterministic: all building blocks of the inventive system are based on deterministic functions. As a consequence, load balancing according to the invention can always be performed within the same amount of time, regardless of the classifier information extracted by the parser or any traffic shape characteristics.

Software-based forwarding engines: with forwarding engines operating at a fraction of the full aggregate link rate, it becomes possible according to the invention to keep these engines implemented in software rather than in hardware. A software implementation can reduce the time to market and minimizes the risks related to technology updates.

Scalable: the scalable approach of the load balancer typical for the invention can also be applied to itself. A hierarchical load balancing scheme (FIG. 3) can be build with a simple root load balancer distributing the flows over N other load balancers which may have more features. In fact, an essential aspect of the invention can be expressed in these terms: it is simpler and cheaper to build a load balancer according to the invention for processing a load of N via N processors of a capacity of one each rather than to build one processor with the capacity N. In this way, a processing capacity can be achieved by way of load balancing according to the invention that cannot be achieved at present in any single processor.

Flow preserving: the method according to the invention is flow-preserving. There is no need for reordering of packets within a flow so as to avoid wastage of bandwidth and processing. Flow preserving also guarantees that forwarding is always done once (at one place) so as to simplify updates and maintenance of the context of the forwarding engines.

Heterogeneous architecture: because there is no need for the individual network processors to communicate with each other, differing processors originating from different vendors can be connected. This has the added advantage to enable mixing of network processors which are each specialized in a particular protocol and/or network processors that may not have the same power (cf. the heterogeneous architecture example shown in FIG. 4).

Single Chip Solution: All building blocks of the inventive system are capable of being integrated in CMOS VLSI devices.

Adaptive Timers: the effectiveness of the invention is based, in part at least, on the dynamic setup and release of the lookup memory entries. The operation could become static and inefficient if lookup memory entries are not freed frequently enough. To this end, an adaptive management of the memory entries can be implemented so as to dynamically change the value of the proposed timer entry according to the overall entries consumption. With a decreasing value of the flow timeout, flows start expires faster and more entries start to be freed.

Figure 7:
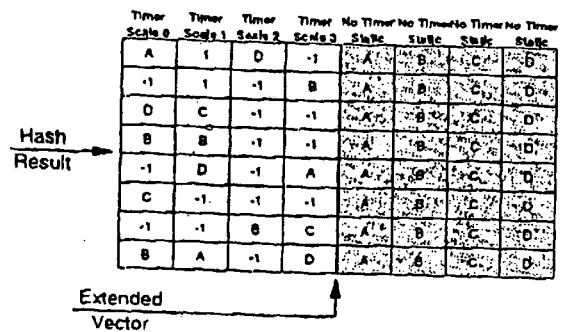
FIG. 7 shows an example of static and dynamic entries using the invention.

Static Lookup Memory Entries : negotiated services and bit rates through traffic management may need to always balance these services on the same network processor. To this end, static entries into the Lookup Memory can be implemented to be setup by a control point processor (cf. static and dynamic entries as shown in FIG. 7).

IPinIP Encapsulation: The load balancer can be assigned an IP address so that a match of the destination address with the Load Balancer IP address indicates a tunneled IP traffic for which the parser can extract the classifier bits from the encapsulated traffic. This would generally be precluded, however, for encrypted tunneling.

Trunk Grouping: this concept aims at creating a virtual link from several physical links and spread the incoming packets over them and serves to increase flexibility and scalability of the inventive method (cf. trunk grouping, FIG. 8).

While specific embodiment have been illustrated and explained above, various modifications are within the ambit of the present invention. For example the load balancing means could be modified for onetime assignment versus dynamic reassignment if a means is provided for migrating a flow from an overloaded network processor to a less loaded one; such a scheme is said to be onetime assignment, with the load balancing decision made at only one point in time. In contrast, a dynamic reassignment scheme would try to improve the earlier decisions according to changing traffic conditions or demands, and would try to adapt to these changes. This adaptation could take the form of a migrating flows, including current state information tied to a particular network processor.

When considering ways to perform a dynamic reassignment the price to be paid in terms of overhead price must be weighed against possible benefits. On the other hand, as the load metrics algorithm tends to load each network processor in a fair manner such that the processors receive approximately the same loads (considering that an aggregated trunk carries a multitude of flows), and should become overloaded almost simultaneously. Use of over-dimensioned processors is a conventional means to improve this since it is well known common rule to always over-engineer a forward engine in order to absorb possible changes and upgrades, e.g. to make an OC12 processor to support 800 Mb/s.

The invention is expected to be of use for parallel processing systems like workstation clusters or message-passing multi computer systems, parallel storage systems, parallel databases systems, or WEB server dispatchers.

The present invention can be realized in hardware, software, or a combination of hardware and software. The present invention can be realized in a centralized fashion in one computer system, or in a distributed fashion where different elements are spread across several interconnected computer systems. Any kind of computer system—or other apparatus adapted for carrying out the methods described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context is meant to include any expression, in any language, code or notation, of a set of instructions intended to cause a system having an information processing capability to perform a particular function either directly or after either or both of the following: a) conversion to another language, code or notation; b) reproduction in a different material form.

It is noted that the foregoing has outlined some of the more pertinent objects and embodiments of the present invention. The concepts of this invention may be used for many applications. Thus, although the description is made for particular arrangements and methods, the intent and concept of the invention is suitable and applicable to other arrangements and applications. It will be clear to those skilled in the art that other modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art. Thus, it should be understood that the embodiments has been provided as an example and not as a limitation. The scope of the invention is defined by the appended claims.

Having thus described our invention, what we claim as new and desire to secure by Letters Patent is as follows:

1. A real-time load-balancing system for distributing a sequence of incoming data packets emanating from a high speed communication line to a plurality of processing means, each operating at a capacity that is lower than the capacity of the high speed communication line, said system comprising:
   a parser means capable of extracting a configurable set of classifier bits from the incoming packets for feeding into a compression means;
   said compression means being capable of reducing a bit pattern of length K to a bit pattern having a length L which is a fraction of K;
   a pipeline block for delaying incoming packets until a load balancing decision is found, and
   an inverse demultiplexer for receiving a port identifier output from said compression means as selector and for directing pipelined packets to the appropriate output port.

2. The system of claim 1 additionally comprising a lookup memory for outputting a port identifier based on an index computed by said compression means, wherein each entry into said lookup memory is capable of dynamic coordination to any output port of said system so as to populate a large number of consumer unit requests per lookup memory entry and to collect lookup memory locations that are no longer in use for providing flexibility to perform a load balancing by providing a timeout per memory entry.

3. The system of claim 1 additionally comprising an extended classifier means.

4. The system of claim 1 additionally comprising a feedback loop for controlling load distribution and for allocating data packets to said data processing means.

5. The system of claim 1 wherein said compression means is a nonlinear hashing function.

6. A method for distributing a sequence of incoming data packets emanating from a high speed communication line to a plurality of processing means, each processing means operating at a capacity that is lower than the capacity of the high speed communication line, said method comprising:
   providing a parser means for extracting a configurable set of classifier bits from the incoming packets for feeding into a compression means;
   said compression means reducing a bit pattern of length K to a bit pattern having a length L which is a fraction of K;

a pipeline block for delaying incoming packets until a load balancing decision is found, and an inverse demultiplexer for receiving a port identifier output from said compression means as selector and for directing pipelined packets to the appropriate output port.

7. The method of claim 6 comprising additionally providing a lookup memory for outputting a port identifier based on an index computed by said compression means, wherein each entry into said lookup memory is coordinated dynamically to any output port and to populate a large number of consumer unit requests per lookup memory entry while collecting lookup memory locations that are no longer in use for providing flexibility to perform a load balancing by providing a timeout per memory entry.

8. The method of claim 6 comprising additionally providing an extended classifier means.

9. The method of claim 6 additionally comprising providing a feedback loop for controlling load distribution and for allocating data packets to said data processing means.

10. The method of claim 8 wherein a nonlinear hashing function said is used as said compression means.

11. An article of manufacture comprising a computer usable medium having computer readable program code means embodied therein for causing distribution of a sequence of incoming data packets emanating from a high speed communication line to a plurality of processing means, the computer readable program code means in said article of manufacture comprising computer readable program code means for causing a computer to effect the steps of claim 6.

12. A program storage device readable by machine, tangibly embodying a program of instructions executable by the machine to perform method steps for distributing a sequence of incoming data packets emanating from a high speed communication line to a plurality of processing means, said method comprising the steps of claim 6.

13. An real-time load-balancing apparatus for distributing a sequence of incoming data packets emanating from a high speed communication line to a plurality of processing means, each operating at a capacity that is lower than the capacity of the high speed communication line, said apparatus comprising:

a parser, the parser capable of extracting a configurable set of classifier bits from the incoming packets for feeding into a compressing module, said compressing module being capable of reducing a bit pattern of length K to a bit pattern having a length L which is a fraction of K;

a pipeline blocker for delaying incoming packets until a load balancing decision is found, and an inverse demultiplexer for receiving a port identifier output from said compressing module as selector and for directing pipelined packets to an appropriate output port.

14. The apparatus of claim 13 additionally comprising a lookup memory for outputting a port identifier based on an index computed by said compressing module, wherein each entry into said lookup memory is capable of dynamic coordination to any output port of said apparatus so as to populate a large number of consumer unit requests per lookup memory entry and to collect lookup memory locations that are no longer in use for providing flexibility to perform a load balancing by providing a timeout per memory entry.

15. The apparatus of claim 13 additionally comprising an extended classifier module.

16. The apparatus of claim 13 additionally comprising a feedback loop for controlling load distribution and for allocating data packets to said data processing means.

17. The apparatus of claim 13 wherein said compressing module uses a nonlinear hashing function.

* * * * *